United States Patent
Jain et al.

(10) Patent No.: US 10,133,474 B2
(45) Date of Patent: Nov. 20, 2018

(54) DISPLAY INTERACTION BASED UPON A DISTANCE OF INPUT

(71) Applicant: International Business Machines Corporation, Armonk, NY (US)

(72) Inventors: Mohit Jain, Seattle, WA (US); Ashok Pon Kumar Sree Prakash, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

(21) Appl. No.: 15/184,594

(22) Filed: Jun. 16, 2016

(65) Prior Publication Data
US 2017/0364229 A1 Dec. 21, 2017

(51) Int. Cl.
| G06F 3/041 | (2006.01) |
| G06F 3/0488 | (2013.01) |
| G06F 3/0481 | (2013.01) |
| G06F 3/01 | (2006.01) |

(52) U.S. Cl.
CPC .......... *G06F 3/0488* (2013.01); *G06F 3/0416* (2013.01); *G06F 3/04817* (2013.01); *G06F 3/017* (2013.01)

(58) Field of Classification Search
None
See application file for complete search history.

(56) References Cited

U.S. PATENT DOCUMENTS

| 6,741,684 B2 | 5/2004 | Kaars |
| 7,667,686 B2 | 2/2010 | Suh |
| 9,268,407 B1 * | 2/2016 | Noble .................. G06F 3/0488 |

(Continued)

FOREIGN PATENT DOCUMENTS

| CN | 102650905 A | 8/2012 |
| CN | 102750067 A | 10/2012 |
| WO | WO2013077883 A1 | 5/2013 |

OTHER PUBLICATIONS

Chen, Xiang Anthony et al., "Air+Touch: Interweaving Touch & In-Air Gestures", UIST'14, Oct. 5-8, 2014, Honolulu, HI, USA, 7 pages, ACM Digital Library.

(Continued)

*Primary Examiner* — Joseph Haley
(74) *Attorney, Agent, or Firm* — Ference & Associates LLC

(57) ABSTRACT

One embodiment provides a method including utilizing at least one processor to execute computer code that performs the steps of: receiving, at a transmission device communicating with a display device, a first user input, wherein the first user input activates a mode, of the display device, allowing a user to control a graphical user interface on the display device; thereafter, detecting, at the transmission device, a second user input, wherein the second user input comprises instructions for a control action for manipulating the graphical user interface; identifying the distance between an input object providing the second user input and a surface of the transmission device; modifying, based upon the distance, an attribute of the control action; and providing instructions to the display device to perform the control action having the modified attribute. Other aspects are described and claimed.

18 Claims, 6 Drawing Sheets

(56) References Cited

U.S. PATENT DOCUMENTS

| | | | |
|---|---|---|---|
| 2003/0038927 A1 | 2/2003 | Alden | |
| 2013/0296057 A1 | 11/2013 | Gagner et al. | |
| 2014/0123077 A1 | 5/2014 | Kutliroff et al. | |
| 2014/0267130 A1 | 9/2014 | Hwang et al. | |
| 2014/0282273 A1 | 9/2014 | Anderson | |
| 2016/0098094 A1* | 4/2016 | Minkkinen | G06F 3/017 345/156 |
| 2016/0239201 A1* | 8/2016 | Wang | G06F 3/04883 |
| 2017/0031463 A1 | 2/2017 | Charbiwala et al. | |

OTHER PUBLICATIONS

Badillo, Brian et al., "Literature Survey on Interaction Techniques for Large Displays", Technical Report TR-06-21, Computer Science, Virginia Tech, 2006, 13 pages.

Dachselt, Raimund et al., "Natural Throw and Tilt Interaction between Mobile Phones and Distant Displays", CHI 2009, Apr. 4-9, 2009, Boston, Massachusetts, USA, 6 pages, ACM Digital Library.

Jain, Mohit et al., "Comparison of Phone-based Distal Pointing Techniques for Point-Select Tasks", Interact 2013, Part II, LCNS 8118, 8 pages, P.Kotze et al. (Editors), available at: http://www.dgp.toronto.edu/~mjain/INTERACT-2013b.pdf.

Boring, Sebastian, et al., "Scroll, Tilt or Move It: Using Mobile Phones to Continuously Control Pointers on Large Public Displays", OZCHI 2009, Nov. 23-27, 2009, Melbourne, Australia, 8 pages, ACM Digital Library.

McCallum, David C. et al., "ARC-Pad: Absolute+Relative Cursor Positioning for Large Displays with a Mobile Touchscreen", UIST'09, Oct. 4-7, 2009, Victoria, British Columbia, Canada, 4 pages, ACM Digital Library.

Shirazi, Alireza Sahami et al., "Flashlight Interaction: A Study on Mobile Phone Interaction Techniques with Large Displays", MobileHCI'09, Sep. 15-18, 2009, Bonn, Germany, 2 pages, ACM Digital Library.

* cited by examiner

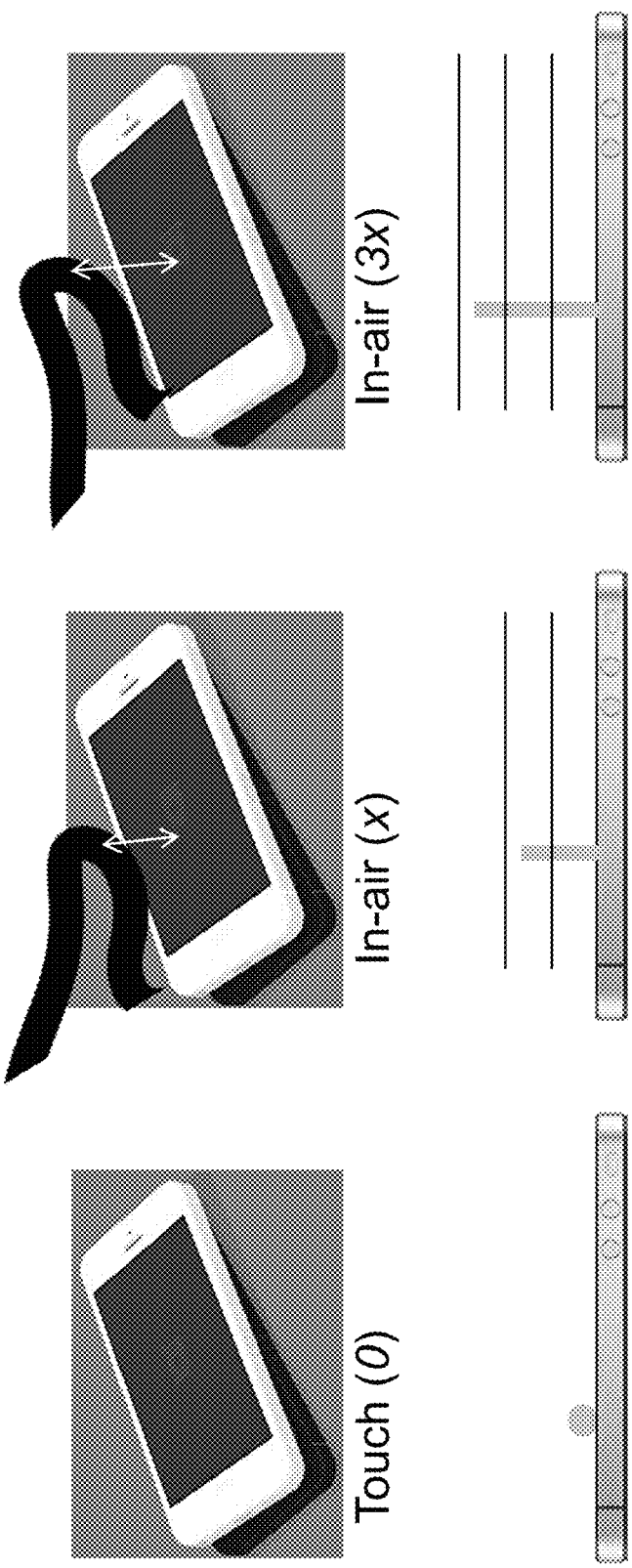

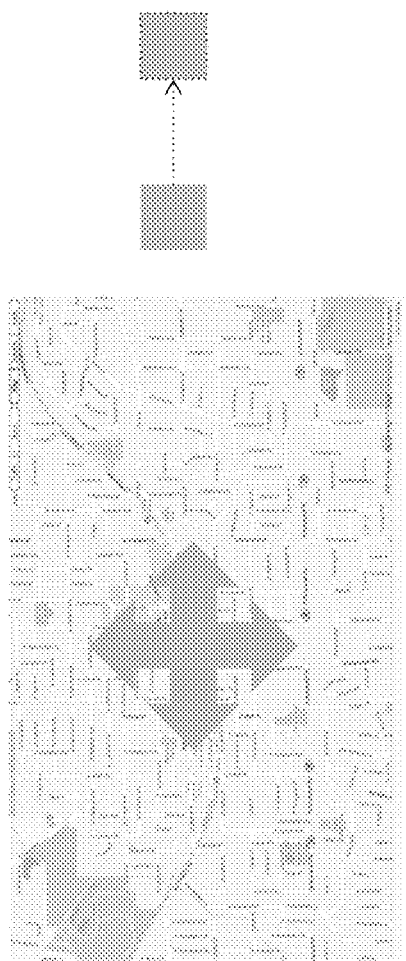
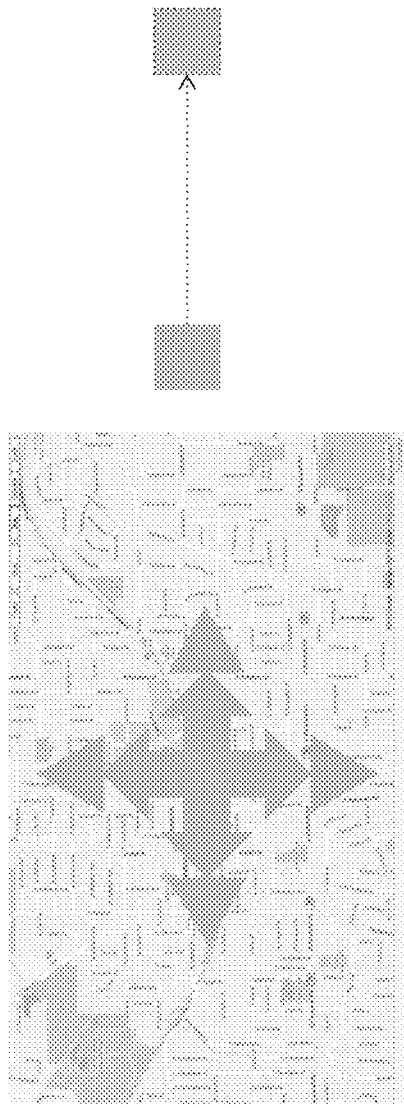

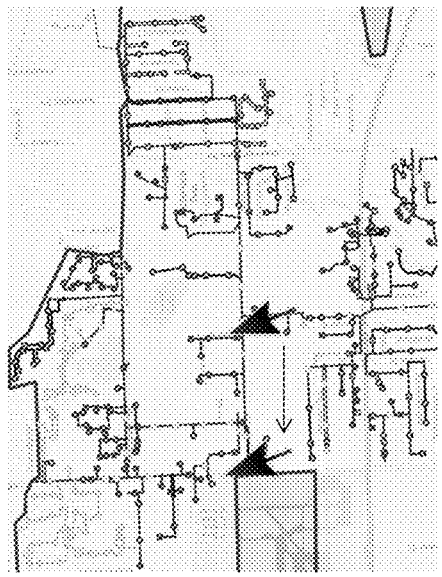
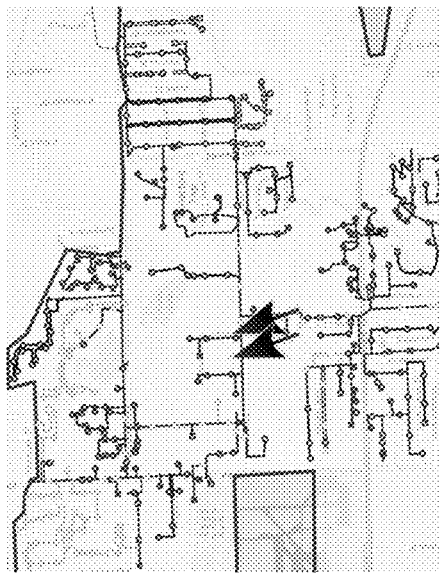
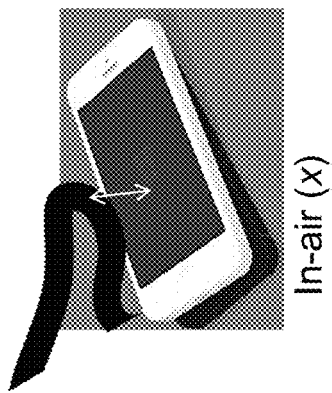
FIG. 4A
FIG. 4B
Touch (O)
In-air (x)

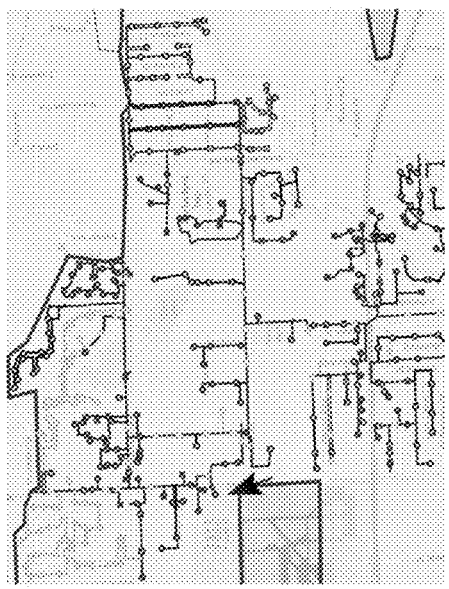
FIG. 5A
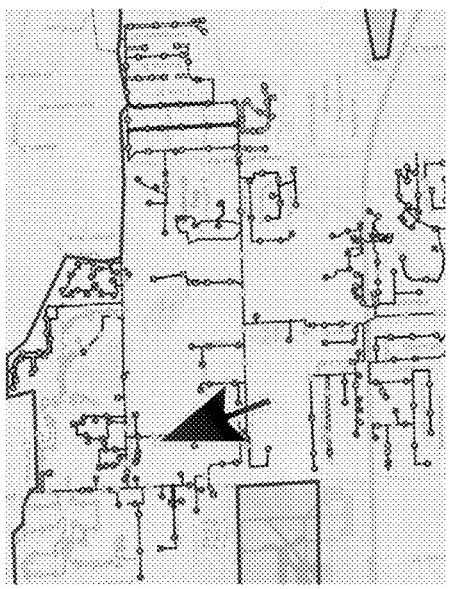
FIG. 5B
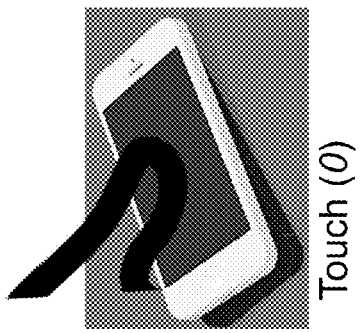
Touch (0)
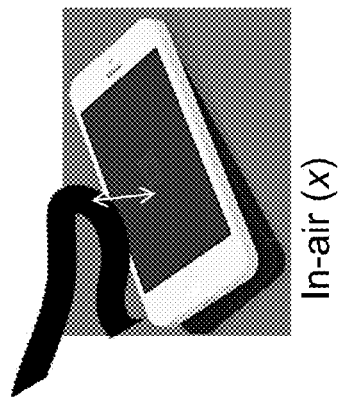
In-air (x)

DISPLAY INTERACTION BASED UPON A DISTANCE OF INPUT

BACKGROUND

Digital and interactive displays are becoming more prevalent. For example, some digital displays are being used to replace more traditional forms of the display. For example, traditional billboards are being replaced with digital billboards, digital displays are replacing standard notice boards, traditional scoreboards are being replaced with digital displays, and the like. In addition to replacing traditional display forms, cities and companies are frequently using digital displays to convey information to people. One advantage that digital displays provide over more traditional displays is that the digital displays can provide a way of delivering dynamic content to users. For example, instead of a scoreboard showing only the score or simple alphanumeric, the display can be changed to display short clips or graphics during a game.

Also, due to advancements in technology, digital displays are becoming larger. For example, digital displays have been created that are hundreds of feet wide. Additionally, more displays are providing users the ability to interact with the display and objects displayed on the display. One problem that occurs with the increasing ability to interact with the digital displays is that interaction with the digital displays becomes more difficult or cumbersome, especially when using traditional interaction devices or techniques.

BRIEF SUMMARY

In summary, one aspect of the invention provides a method, comprising: utilizing at least one processor to execute computer code that performs the steps of: receiving, at a transmission device communicating with a display device, a first user input, wherein the first user input activates a mode, of the display device, allowing a user to control a graphical user interface on the display device; thereafter, detecting, at the transmission device, a second user input, wherein the second user input comprises instructions for a control action for manipulating the graphical user interface; identifying the distance between an input object providing the second user input and a surface of the transmission device; modifying, based upon the distance, an attribute of the control action; and providing instructions to the display device to perform the control action having the modified attribute.

Another aspect of the invention provides an apparatus, comprising: at least one processor; and a computer readable storage medium having computer readable program code embodied therewith and executable by the at least one processor, the computer readable program code comprising: computer readable program code that receives, at a transmission device communicating with a display device, a first user input, wherein the first user input activates a mode, of the display device, allowing a user to control a graphical user interface on the display device; computer readable program code that thereafter, detects, at the transmission device, a second user input, wherein the second user input comprises instructions for a control action for manipulating the graphical user interface; computer readable program code that identifies the distance between an input object providing the second user input and a surface of the transmission device; computer readable program code that modifies, based upon the distance, an attribute of the control action; and computer readable program code that provides instructions to the display device to perform the control action having the modified attribute.

An additional aspect of the invention provides a computer program product, comprising: a computer readable storage medium having computer readable program code embodied therewith, the computer readable program code comprising: computer readable program code that receives, at a transmission device communicating with a display device, a first user input, wherein the first user input activates a mode, of the display device, allowing a user to control a graphical user interface on the display device; computer readable program code that thereafter, detects, at the transmission device, a second user input, wherein the second user input comprises instructions for a control action for manipulating the graphical user interface; computer readable program code that identifies the distance between an input object providing the second user input and a surface of the transmission device; computer readable program code that modifies, based upon the distance, an attribute of the control action; and computer readable program code that provides instructions to the display device to perform the control action having the modified attribute.

A further aspect of the invention provides a method, comprising: receiving, at an input device communicating with a display device, a first user input for enabling a control mode, of the display device, for controlling a graphical user interface on the display device; receiving, at the input device, a second user input providing instructions for manipulating the graphical user interface; identifying the distance between an input object providing the second user input and a surface of the input device; scaling, at the input device, proportionally to the distance, a response to the instructions; and providing instructions to the display device to manipulate the graphical user interface using the scaled response.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2A-2C illustrates an example of distance based display interaction.

FIG. 3A-3B illustrates an example of display interaction based upon a distance of the input.

FIG. 4A-4B illustrates an example of display interaction based upon a distance of the input.

FIG. 5A-5B illustrates an example of display interaction based upon a distance of the input.

DETAILED DESCRIPTION

Figure 1:
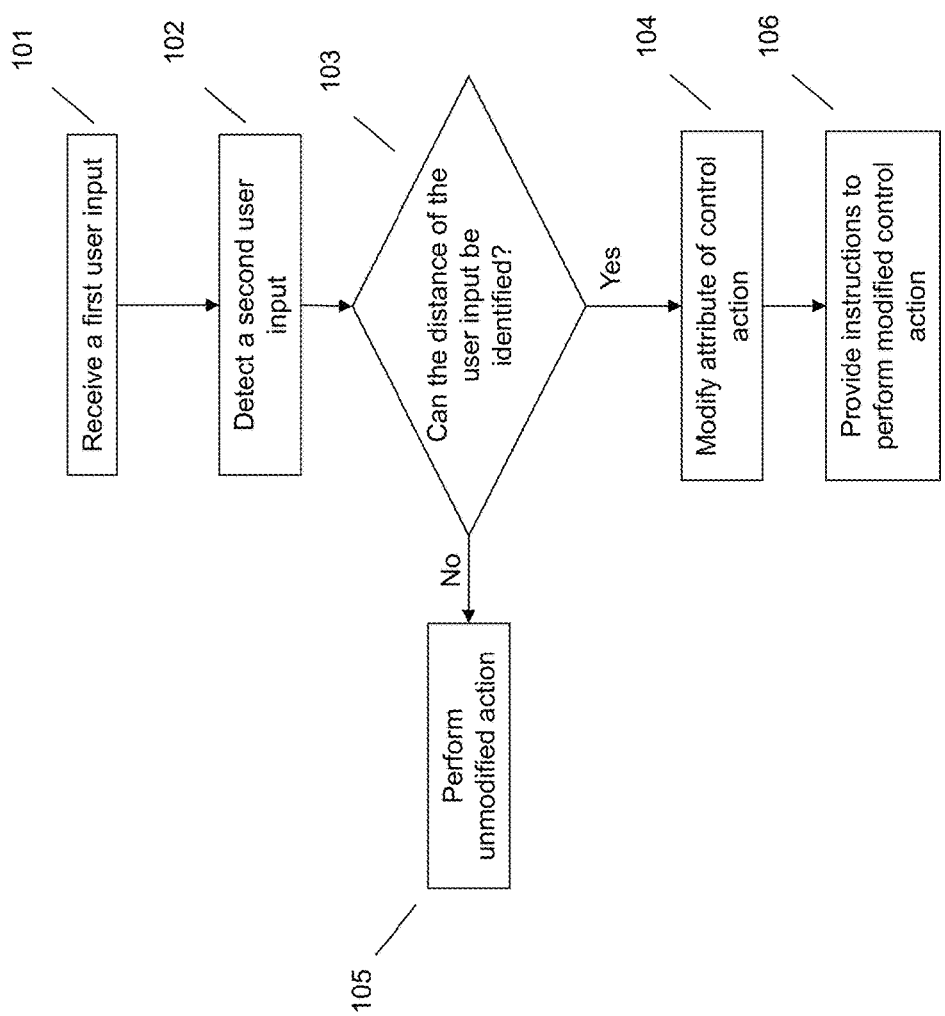
FIG. 1 illustrates a method of display interaction based upon a distance of the input.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-6. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 6, whether on a server computer, a client computer, a node computer in a distributed network, or any combination thereof.

The increasing prevalence of digital displays results in displays that are located in many different locations. For example, displays may be located on the sides of transit tunnels, in the middle of large fields, hanging from ceilings of large buildings, and the like. Additionally, the digital displays are increasing in size and becoming very large. Some digital display also allow users to interact with the displays and objects displayed on the device. However, due to the size, location, and interactivity of digital displays, interaction with these displays may be difficult. For example, due to the distance between a user and the display it may be difficult for a user to connect an input device to the display through a wired connection.

Additionally, even if an input device can be connected to a display, it may be difficult to provide non-tedious user interaction. For example, due to the large size of a display device, conventional techniques for user interaction may require a user to continuously provide input to the display in order to complete a desired action. As an example, if a user wants to move a cursor from one side of the display to another, the cursor has to be dragged across a large distance to reach the desired display content. This may require that a user physically move a mouse across a large distance due to the response of the mouse being designed for much smaller display sizes (i.e., the cursor moves a short distance relative to the physical movement of the mouse). As another example, if a user wants to zoom in on a particular area of the display, a user may have to scroll or click for a significant duration of time before reaching the desired zoom level.

One solution for interacting with such displays is the creation of specific devices for interaction with the large displays. One example of such a device is interaction gloves. These allow a user to wear gloves which are then used to interact with the display device. The problem with such solutions is that the user has to buy the special hardware, which adds to the cost of the display. Additionally, the user has to learn how to use the special hardware to interact with the display. Generally, because the special hardware is drastically different than conventional input devices (e.g., mice, keyboards, etc.) the learning curve for such hardware is very steep.

Additionally, many of the current solutions require the user to point the input device at the display. Pointing at the display results in the user having his or her arm(s) extended outwards for a long period of time. Other solutions require the user to perform many movements, which results in the user moving substantial portions of his or her whole body when interacting with the display. Such large movements result in a great amount of physical exertion by the user. Thus, using such solutions results in the user getting tired when interacting with the display. Additionally, as the user gets tired and because the displays are so large, the ability of the user to accurately interact with the display may be decreased. For example, as the user's arm(s) get tired, the user may find it difficult to accurately point to the desired location on the display device.

Accordingly, an embodiment provides a method of modifying an attribute of a user input to provide for a scaled user interaction with a display device. The modification of the user input is at least partially based upon the distance that the user input is provided from a surface of an input or transmission device. For example, a user may interact with a display device using a standard touch-screen phone. As the user provides input relating to an interaction (e.g., panning, zooming, cursor movement, cursor size, etc.) on the display device, the user can vary an attribute (e.g., speed, size of icon, distance of movement, angle, etc.) of the response on the display device by varying the distance that the input is provided from the screen. In one embodiment, a first user input may be received identified that activates a mode of interaction with the display device. After the mode of interaction has been initiated, an embodiment may receive user input corresponding to an action used to manipulate the graphical user interface on the display device.

In receiving the user input corresponding to the control action, an embodiment may identify the distance that the input was provided from the surface of the input or transmission device. Based upon the distance that the input was provided from the input device, an attribute of the action may be modified. For example, if the input is provided at the surface of the device, an embodiment may perform the action as normal. If, however, the input is provided a distance above the surface of the device, the action may be modified. For example, in one embodiment, the speed of the action may be increased or decreased based upon how far the input is provided from the surface of the device. In one embodiment, the modification of the action may be directly or indirectly proportional to the distance that the input is provided from the input device.

Such a system provides a technical improvement over current systems for interacting with display devices by providing a method and system of interaction that allows a user to use a standard or readily accessible input device. Embodiments also provide a system which does not require the user to learn a new system to interact with the display device. Additionally, the user does not have to provide a whole arm or body movement to interact with the display. Instead the user can provide a user input with a single finger, hand, thumb, etc. on a standard device. This means that the user will not get tired from interacting with the display device. The systems and methods also provide a system in which the user can dynamically modify a characteristic of the action the user is attempting to complete. Therefore, the user can provide more accurate or precise interaction with the display device. Thus, embodiments provide for systems and methods which provide a more intuitive and user-friendly way of interacting with display devices.

Referring now to FIG. 1, an embodiment may receive, at an input or transmission device, user input at 101. An input or transmission device may be a variety of devices. For example, the input device may include any standard input device (e.g., mouse, keyboard, number keypad, etc.). The input device may also include an information handling device (e.g., smart phone, tablet, cellular phone, touch pad, handheld gaming system, etc.). In other words, the input device may be any handheld device that can communicate or be set up to communicate with the display device.

To ensure that the display device can be controlled or communicate with the input device, the input device may be paired with the display device. In one embodiment, this pairing may include the input device and display device exchanging key pairs. Alternatively, the input device may communicate with the display device over a wired or wireless network, short range communication (e.g., infrared, Bluetooth, near field communication, etc.) channel, and the like. For example, the input device and display device may connect to the same wi-fi network, which then allows the input device and display device to communicate with each other. As another example, the input device and display device may communicate using infrared communications. Communications with the display device may be protected by security or exchange protocols. Thus, to communicate with the display device, a password, security key, or other authorization may need to be communicated by or from the input device. The display device or display device network may also be able to identify the input device, for example, through a device fingerprint, device address, or the like, as a safe device for allowing control and communication.

The user input received at 101 may activate a mode for user interaction with the display device. The user input may activate a mode on the display device allowing a user to control a graphical user interface on the display device. In other words, the user input may indicate to the display device that the user is attempting to interact with the display device. The user input or trigger event may be preset or may instead be configurable by the user. Example types of trigger events include a tap in a particular location, a series of taps, a specific gesture or touch pattern, a combination of taps and touches, a spoken word or phrase, a combination of input types, selection of a button or icon, and the like. In one embodiment the trigger event may be mapped to a particular user interaction or mode. For example, the user input may be mapped to a specific interaction (e.g., panning, zooming, cursor movement, cursor distance, cursor size, etc.). For example, a double tap on the front (or back) of the input device may be a trigger event that is mapped to the user interaction of zooming and a single tap and drag may be mapped to a different user interaction.

Once the mode is activated, an embodiment may receive a second user input at 102. The user input may be captured using a sensor. The sensor may be coupled or integral to the input device, for example, a camera, depth camera, 3D touch sensor, capacitive sensor, and the like. Alternatively, the sensor may be in communication with the display device or input device, but not attached to either device. For example, a user may be using a wireless trackpad as an input device for communicating with the display device. The sensor may be a camera that is located on another device within the room that can communicate with either the wireless trackpad or the display device.

The user input may comprise instructions for a control action for manipulating the graphical user interface on the display device. For example, the input device may provide instructions to the display device indicating to the display device which action is to be taken. The user input may be mapped to a control action for manipulating the graphical user interface on the display device. For example, if the mode that has been activated is panning, then the user input may be mapped to the control action of panning in a specific direction. For example, a transmission device may not have multiple buttons or touch areas which are mapped to different control actions. Therefore, the control action that is the transmission device provides instructions to the display device may be chosen based upon the user interaction mode that has been activated. As an example, the scroll wheel of a mouse may both scroll up and down on the screen and also zoom into a specific area of a display. The system identifies which of these actions the user wishes to perform based upon whether the user has chosen the scrolling user interaction mode or the zooming user interaction mode.

In receiving the user input, an embodiment may not only identify the coordinates or location of the input, but it may also identify how far the input was provided from the surface of the input device. In other words, an embodiment may identify the distance between the input object (e.g., finger, thumb, stylus, hand, writing implement, etc.) and the surface of the transmission device. For example, referring to FIG. 2A, an input at the surface of the input device may be identified as (0). However, if the input is received a distance from the surface, an embodiment may identify how far the distance is. For example, in FIG. 2B, the distance is identified as (x). When the input moves further from the surface, as in FIG. 2C, the distance is increased, for example, to 3(x). As shown in FIGS. 2A-2C, the distance may be measured as a factor of a predetermined distance. For example, FIG. 2B shows a predetermined distance being measured as (x). When the input then moves further from the surface, the distance is measured in a factor of (x) (e.g., FIG. 2C where the distance is identified as (3x)).

However, other identifications of the distance are possible. For example, the distance may be identified using a measurement unit (e.g., millimeters, inches, centimeters, etc.). As another example, the distance may be measured in thresholds. For example, if the input is received above a first distance and below a second distance, the distance may be identified as within one threshold. However, if the input is received above the second distance, the distance may be identified as within a different threshold.

If the distance of the user input cannot be identified at 103, an embodiment may provide instructions to the display device to perform the requested action with no modifications at 105. If, however, an embodiment identifies that the user input does contain a distance component at 103, an embodiment may modify an attribute or characteristic of the action at 104. The attributes of the action may include the speed associated with action, a size of an icon associated with the action, a distance or amount of movement associated with the action, an area associated with the action, an angle of the movement, and the like. For example, if a user is selecting a group of icons, as the input moves away from the surface of the input device, the area that the selection encompasses may increase or decrease.

As an example, FIGS. 3A-3B show a user interaction associated with panning. In FIG. 3A, the input is received at the surface of the input device. Thus, the speed of the panning is the normal speed associated with the user interaction. As the input moves away from the surface of the device in FIG. 3B, the speed of the panning is increased. As another example, FIGS. 4A-4B show a user interaction associated with moving a cursor (i.e., an icon associated with the action). In FIG. 4A, the input is received at the surface of the input device. Thus, the distance that the cursor moves is the typical distance that the cursor would move. As the input moves away from the surface of the device in FIG. 4B, the distance that the cursor moves is decreased, to increase precision. As another example, FIGS. 5A-5B show a user interaction associated with the size of the cursor. In FIG. 5A, the input is received at the surface of the input device. Thus, the size of the cursor is the standard size associated with the cursor. As the input moves away from the surface of the device in FIG. 5B, the size of the cursor increases.

The amount that the attribute or characteristic is modified may be proportional to the distance that the input is received from the surface of the input device. This proportionality may be direct or indirect depending on the user interaction that the user is trying to perform. For example, the examples as shown in FIGS. 3A-3B and 5A-5B, show an example of direct proportionality. In other words, the characteristic increases as the input is received further from the surface of the input device. FIGS. 4A-4B show an example of indirect proportionality. In other words, the characteristic decreases as the input is received further from the surface of the input device. As can be appreciated by one skilled in the art, the amount the characteristic is modified does not have to be proportional to the distance from the screen. For example, if the distance is measured with relation to thresholds, then the amount the characteristic is modified may be predetermined by the threshold rules or requirements.

Once an attribute of the action has been modified at 104, an embodiment may provide instructions to the display device to perform the control action having the modified attribute at 106. Performing the action may include sending instructions or communications to the display device to respond to the instruction or perform the action. In one embodiment, when a user wants to stop the mode of user interaction, a third user input or second trigger event may be received. This user input or trigger event may deactivate the mode for user interaction. This trigger event may be the same action or trigger as the first trigger event. For example, if the action required to activate the mode of user interaction is a double tap, to deactivate the mode may also be a double tap. The stop trigger event may also be different from the start trigger event. Additionally, the stop trigger event, like the start trigger event, may be different for specific user interactions. For example, a zoom mode of user interaction may require a different stop trigger event than a panning mode of user interaction. Alternatively, the stop trigger event may be the same trigger event for every mode of user interaction.

Figure 6:
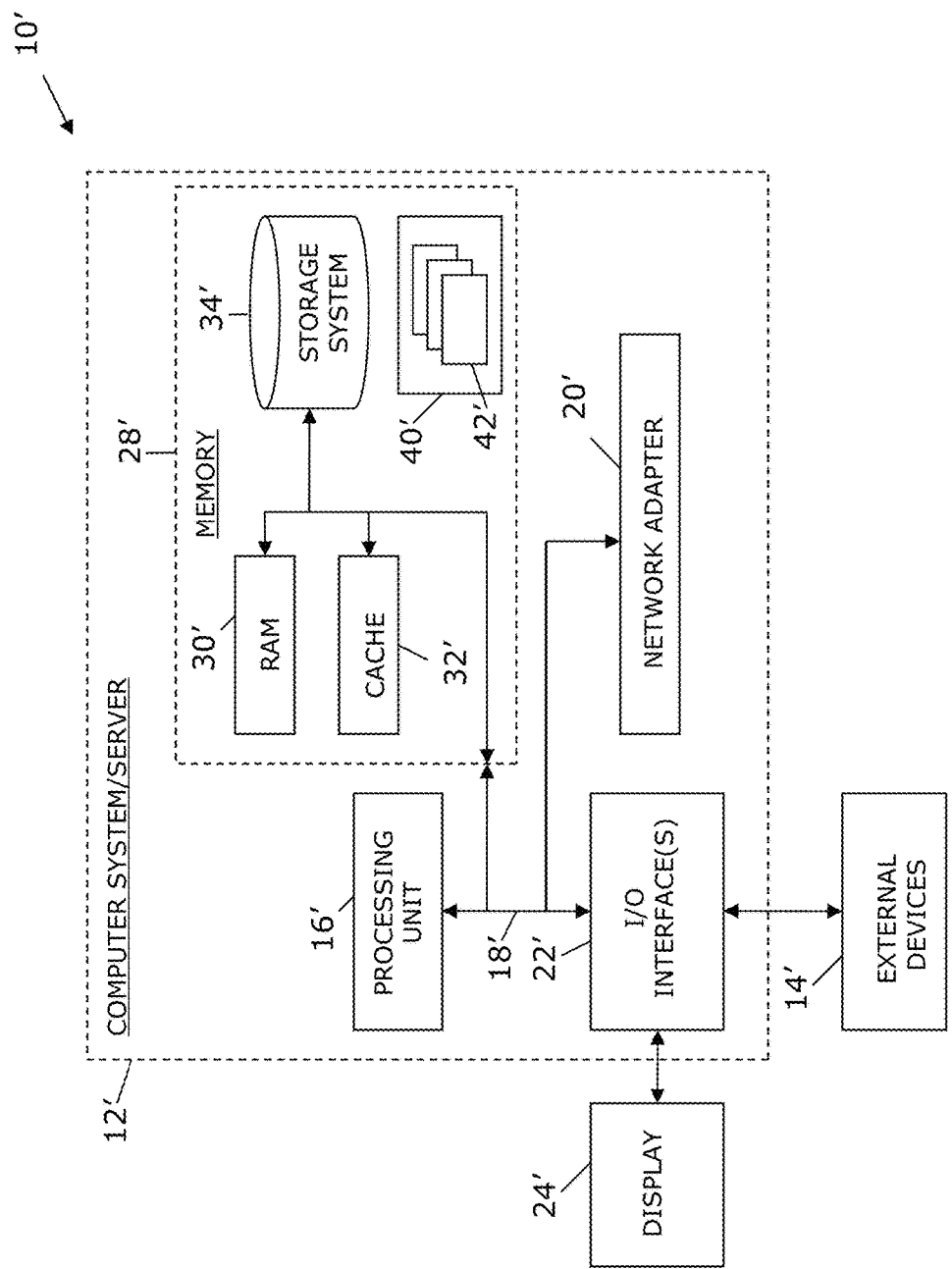
FIG. 6 illustrates a computer system.

As shown in FIG. 6, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   utilizing at least one processor to execute computer code that performs the steps of:
   receiving, at a transmission device separate from and communicating with a display device, a first user input corresponding event that activates predetermined interaction mode of the display device corresponding to the trigger event, allowing a user to control a graphical user interface on the display device via an interaction corresponding to the predetermined interaction mode, wherein different trigger events correspond to different interaction modes;
   thereafter, detecting, at the transmission device, a second user input, wherein the second user input comprises instructions for a control action for manipulating the graphical user interface in a manner corresponding to the activated predetermined interaction mode;
   identifying the location of the second user input with respect to the surface of the transmission device and identifying the distance between an input object providing the second user input and a surface of the transmission device, wherein the location of the second user input identifies an action of the interaction to be performed;
   modifying, based upon the distance, an attribute of the identified action, wherein the modifying comprises modifying the attribute by an amount proportional to the identified distance; and
   providing instructions to the display device to perform the control action according to the identified action having the modified attribute.

2. The method of claim 1, wherein the modifying comprises modifying the attribute by an amount directly proportional to the distance.

3. The method of claim 1, wherein the modifying comprises modifying the attribute by an amount indirectly proportional to the distance.

4. The method of claim 1, wherein the modifying comprises modifying speed of the control action.

5. The method of claim 1, wherein the modifying comprises modifying distance of movement associated with the control action.

6. The method of claim 1, wherein the modifying comprises modifying the size of an icon associated with the control action.

7. The method of claim 1, comprising pairing the transmission device with the display device.

8. The method of claim 1, comprising receiving a third user input, wherein the third user input deactivates the mode.

9. An apparatus, comprising:
   at least one processor; and
   a computer readable storage medium having computer readable program code embodied therewith and executable by the at least one processor, the computer readable program code comprising:
   computer readable program code that receives, at a transmission device separate from and communicating with a display device, a first user input corresponding to a trigger event that activates predetermined interaction mode of the display device corresponding to the trigger event, allowing a user to control a graphical user interface on the display device via an interaction corresponding to the predetermined interaction mode, wherein different trigger events correspond to different interaction modes;
   computer readable program code that thereafter, detects, at the transmission device, a second user input, wherein the second user input comprises instructions for a control action for manipulating the graphical user interface in a manner corresponding to the activated predetermined interaction mode;
   computer readable program code that identifies the location of the second user input with respect to the surface of the transmission device and identifying the distance between an input object providing the second user input and a surface of the transmission device, wherein the location of the second user input identifies an action of the interaction to be performed;
   computer readable program code that modifies, based upon the distance, an attribute of the identified action, wherein the modifying comprises modifying the attribute by an amount proportional to the identified distance; and
   computer readable program code that provides instructions to the display device to perform the control action according to the identified action having the modified attribute.

10. A computer program product, comprising:
    a computer readable storage medium having computer readable program code embodied therewith, the computer readable program code comprising:
    computer readable program code that receives, at a transmission device separate from and communicating with a display device, a first user input corresponding to a trigger event that activates predetermined interaction mode of the display device corresponding to the trigger event, allowing a user to control a graphical user interface on the display device via an interaction corresponding to the predetermined interaction mode, wherein different trigger events correspond to different interaction modes;
    computer readable program code that thereafter, detects, at the transmission device, a second user input, wherein the second user input comprises instructions for a control action for manipulating the graphical user interface in a manner corresponding to the activated predetermined interaction mode;

computer readable program code that identifies the location of the second user input with respect to the surface of the transmission device and identifying the distance between an input object providing the second user input and a surface of the transmission device, wherein the location of the second user input identifies an action of the interaction to be performed;

computer readable program code that modifies, based upon the distance, an attribute of the identified action, wherein the modifying comprises modifying the attribute by an amount proportional to the identified distance; and computer readable program code that provides instructions to the display device to perform the control action according to the identified action having the modified attribute.

11. The computer program product of claim 10, wherein the code that modifies comprises modifying the attribute by an amount directly proportional to the distance.

12. The computer program product of claim 10, wherein the code that modifies comprises modifying the attribute by an amount indirectly proportional to the distance.

13. The computer program product of claim 10, wherein the code that modifies comprises modifying speed of the control action.

14. The computer program product of claim 10, wherein the code that modifies a characteristic comprises modifying distance of movement associated with the control action.

15. The computer program product of claim 10, wherein the code that modifies a characteristic comprises modifying the size of an icon associated with the control action.

16. The computer program product of claim 10, comprising code that pairs the transmission device with the display device.

17. The computer program product of claim 10, comprising code that receives a third user input, wherein the third user input deactivates the mode.

18. A method, comprising:

receiving, at an input device separate from and communicating with a display device, a first user input corresponding to a trigger event that activates a predetermined control mode of the display device corresponding to the trigger event, for controlling a graphical user interface on the display device via an interaction corresponding to the predetermined control mode, wherein different input types are mapped to different control modes;

receiving, at the input device, a second user input providing instructions for manipulating the graphical user interface in a manner corresponding to the activated predetermined control mode;

identifying the location of the second user input with respect to the surface of the input device and identifying the distance between an input object providing the second user input and a surface of the input device, wherein the location of the second user input identifies an action of the interaction to be performed;

scaling, at the input device, proportionally to the distance, an attribute of a response to the instructions; and providing instructions to the display device to manipulate the graphical user interface according to identified action and the scaled response.

* * * * *